June 15, 1965  J. M. LOVING  3,188,754
TESTING AND TEACHING METHOD AND APPARATUS THEREFOR
Filed July 5, 1963  2 Sheets-Sheet 1

JOHN M. LOVING
INVENTOR.

BY Ely Silverman
ATTORNEY

June 15, 1965 J. M. LOVING 3,188,754
TESTING AND TEACHING METHOD AND APPARATUS THEREFOR
Filed July 5, 1963 2 Sheets-Sheet 2
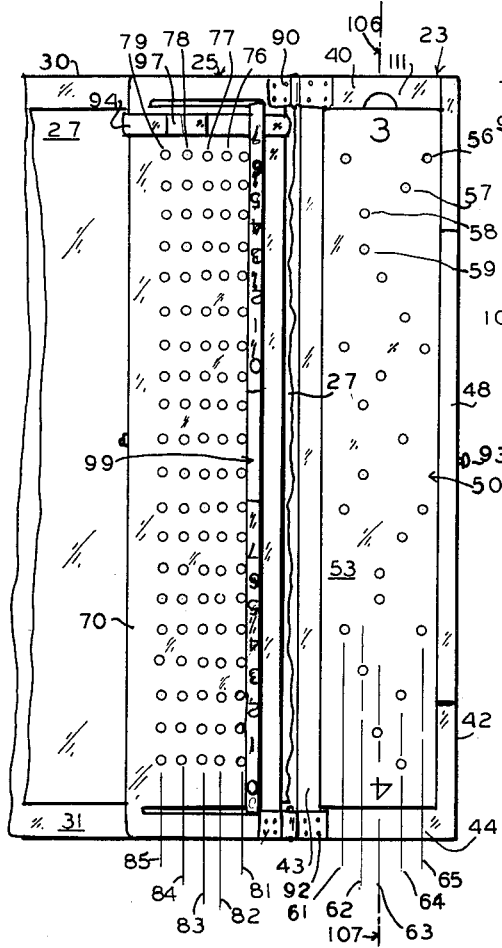
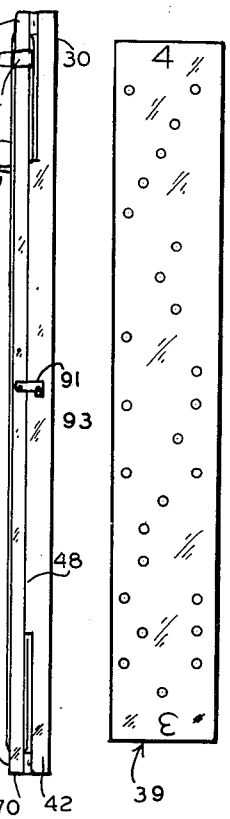
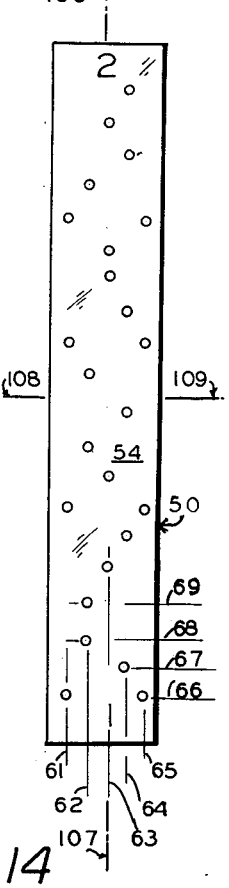
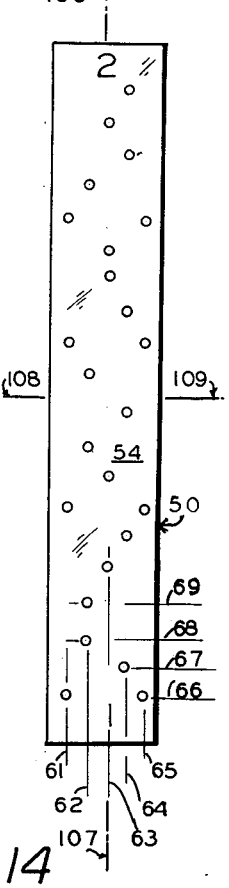
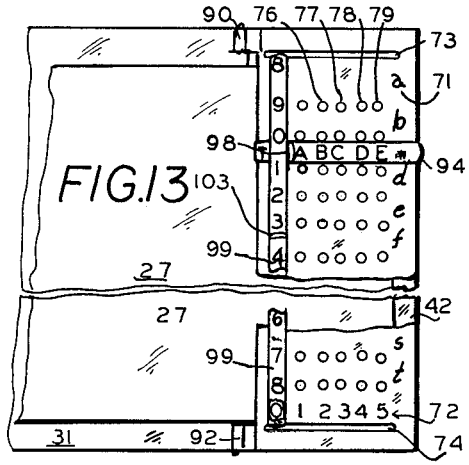
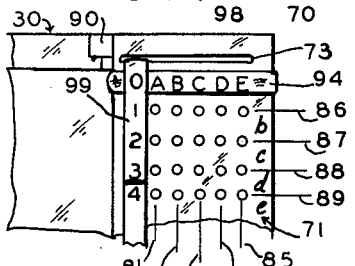
INVENTOR.
JOHN M. LOVING
BY Ely Silverman
ATTORNEY

United States Patent Office 3,188,754
Patented June 15, 1965

3,188,754
TESTING AND TEACHING METHOD AND APPARATUS THEREFOR
John M. Loving, 1605 Bauerle St., Austin, Tex.
Filed July 5, 1963, Ser. No. 292,934
4 Claims. (Cl. 35—48)

This invention relates to an apparatus and method for making, giving, and taking of objective tests and exercises.

One object of this invention is to provide an improved apparatus for use in testing and scoring and teaching.

Yet another object of this invention is to provide an improved method for testing and scoring and teaching.

Still another object of this invention is to provide an apparatus that facilitates the rapid and accurate correction of the objective or multiple choice type of test examination, which apparatus is simple in construction.

Yet another object of this invention is to provide an apparatus which during a test and/or exercise situation provides an instantaneous recognition of correct response and, in case of error, allows the party tested to promptly ascertain the correct response without delay and without a separate and later review of the exercise or test and without help of a teacher, thereby providing an improved "self-teaching" device and process.

Yet another object of this invention is to provide, by a very simple and sturdy apparatus, a very great number of test scoring patterns.

Other objects and benefits of the present invention, as exemplified by the disclosed embodiments thereof, will become apparent to those skilled in the art on study of the following description in conjunction with the accompanying drawings which drawings form a part of the description and wherein the same numbers refer to the same parts throughout all the drawings and wherein.

Figure 1:
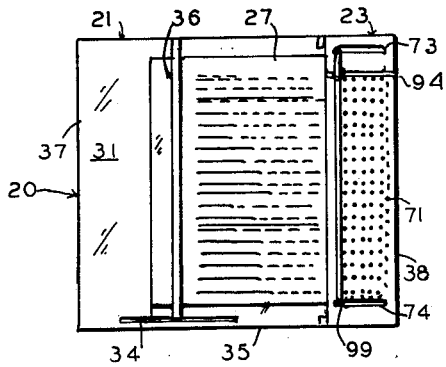
FIGURE 1 is a plan view of an apparatus, generally shown as 20, according to this invention with a work sheet, 27, thereon in its operative position.
Figure 4:
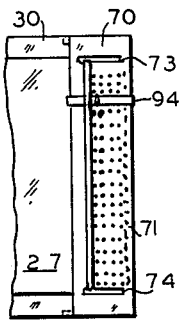
Figure 7:
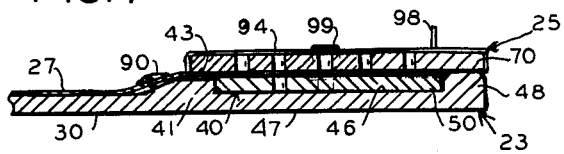
Figure 8:
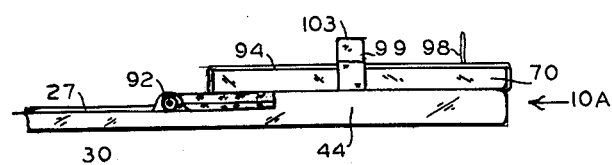

FIGURES 3, 4, 5, and 6 are plan views of the key cover sub-assembly of FIGURE 1 with the horizontal and vertical guides thereof in varying positions. FIGURES 1 through 6 are drawn to the same scale;

FIGURE 7 is a vertical cross sectional view through the plane 7A–7B of FIGURE 1, drawn to a larger scale than in FIGURE 1;

FIGURE 8 is an end view along the direction of the arrow of FIGURE 8A of FIGURE 1 and drawn to the same scale as in FIGURE 7;

FIGURE 9 is a plan view drawn to the same scale as for FIGURE 7 of the apparatus shown in FIGURE 1 with the key cover sub-assembly 25 rotated counter clockwise to the position shown as 9A in FIGURE 7 and exposing the key 50 in its operative position;

FIGURE 10 is an end view along the direction of the arrow 10A of FIGURE 8;

FIGURE 11 is a plan view of another key, 39;

FIGURE 12 is a plan view of key 50 reversed in position from that shown in FIGURE 9;

FIGURE 13 is a plan view in the operative position as shown in FIGURE 4, partly broken away, showing the top and bottom portions of the key cover sub-assembly; and FIGURE 14 is a plan view of the top portion of the apparatus in the position of its parts shown in FIGURE 1. FIGURES 7 through 14 are drawn to the same scale.

The apparatus 20 essentially comprises a base sub-assembly 21, a key and a slot sub-assembly 23, and a key cover sub-assembly 25, and is used with a work sheet 27.

The base sub-assembly 21 comprises a sturdy wooden board 30 provided with a rigid smooth work supporting surface 31 and an elongated narrow aperture 34 which perforates said board and has its lower edge 33 parallel to the lower edge 35 of the board 30 and said edges are close to yet spaced away from each other. A holding means 36, which is a ¼ inch wide and ¹⁄₃₂ inch thick piece of elastic strap in the exemplary embodiment, passes through aperture 34 and extends generally parallel to the left hand edge 37 of board 30 and around the upper edge 32 of the board 30. The right hand side of the board 30 extends to right hand edge 38 of the board and is continuous with the floor of the key and slot sub-assembly.

The key and slot sub-assembly 23 is generally formed of the slot sub-assembly 34 and a key 50. The slot sub-assembly is formed of an inner guide, an outer guide, a bottom guide, and a floor which bound the slot 40 wherein the key 50 lies.

The inner guide 41 is a rectangularly sectioned rigid wooden member with an upper surface 43 slightly yet sufficiently raised from the surface 31 to support the bottom surface of cover 70 at the height of the top surface of key 50. The inner guide 41 is parallel to, but spaced apart from an outer guide 42 at the outer edge 38 of the board 30. The floor 46 of the key and slot sub-assembly is formed of the right hand top portion of the surface 31 of the board 30. In one embodiment thereof for teacher's use, the central portion 47 of the floor 46 of the apparatus 20 is translucent and made of clear methyl methacrylate. The floor 46 is painted a light color, or white if not made of translucent material. The most raised portion 48 of the outer guide 42, relative to surface 31, is at the same level as surface 43 and provides a paper positioning means. Guides 41 and 42 are straight-edged and rectangular in section with their long edges parallel to the edges 38 and 37.

The key 50 is formed of an opaque, rigid, relatively unpuncturable material, such as wood, and is dark in shade and green in color. It is rectangular in section and outline as shown in FIGURES 7 and 9 respectively. Its upper and lower faces 53 and 54 are smooth and flat and are provided with a plurality of cylindrical holes, such as 56, 57, 58, and 59, each with its central axis normal to surfaces, 53 and 54, and each arrayed with its center according to various patterns along the intersection of one of the equispaced longitudinal straight lines, 61, 62, 63, 64, and 65, and one of the equispaced horizontal straight lines as 66, 67, 68, and 69.

The outline of key 50 is symmetrical about its longitudinal central axis 106–107 and about its equatorial axis 108–109 to permit its being located in slot 40 in several different positions, as below described.

The key 50 and the key 39 are identical in outline and thickness and size of hole therein whereby to serve interchangeably in slot 43. Keys 50 and 39 are representative of the interchangeable keys usable in the apparatus 20; such interchangeability however requires appropriate modifications in the question sheet as below described. The key 39 is colored dark red while key 50 is colored dark green. Such color difference serves to distinguish the keys having different hole patterns from each other.

Other keys with different patterns will have different colors.

In the keys for use in this apparatus, as 50 and 39, the pattern of the holes in the key, as shown for keys 50 and 39, is asymmetrical along the central longitudinal axis, 106–107, of each key, as shown for key 50, of the outline of such key. The pattern of holes in such key is also asymmetrical along its equatorial axis 108–109. Each key, as 50, is provided with distinguishing indicia (3) for its upper front face and its lower front face (4) and its rear top face (1) and its rear bottom face (2) to distinguish each such end and the pattern of the holes presented by that key corresponding to the top and upward facing position of each such indicia, for reasons below described, as shown for indicia "3" in FIGURE 9.

The key cover sub-assembly 25 comprises a cover 70 and movable guides 94 and 99. The cover is a rigid flat opaque wooden sheet provided on its upper flat surface 75 with a line 71, of indicia ($a, b, c, d, \ldots r, s, t$) equally spaced from each other and running vertically along the right edge of cover 70 and a line (72) of equispaced horizontal indica (numbers 0, 1, 2, 3, 4, 5), as well as a lower elongated aperture 74 and an upper elongated aperture 73; the cover is also provided with and perforated by a plurality of cylindrical holes all of the same diameter, such as 76, 77, 78, and 79, each hole with its central longitudinal axis normal to the surface 75 and each hole arrayed in a series of vertical columns and horizontal rows of similar holes.

The columns extend for more than a major portion of the length of the cover—almost substantially its full length—(FIGURE 9 is a scale drawing) and the rows extend, as shown in FIGURES 9, 13, and 14, for more than a major portion of the full width of the cover 70. Each hole in the cover is arrayed with its center at the intersection of one of a plurality of equispaced parallel vertical straight lines 81, 82, 83, 84, and 85, with one of a plurality of equispaced horizontal straight lines as 86, 87, 88, and 89, the equal spacing between said horizontal lines correspond to the equal spacing between the vertical indicia (71)—$a, b, c, d, \ldots r, s, t$—on the upper face of said cover. The indicia 71 are located between the lines of holes as 86 through 89. The lines 81–85 determine centers of the columns of holes and each of the horizontal lines, as 86–89, determine the centers of the rows of holes in cover 70. The horizontal indicia are located with the centers of each of numbers 1, 2, 3, 4, and 5, respectively, in line with the center of the columns determined by lines 81, 82, 83, 84, and 85. The center of each of numbers 0, 1, 2, 3, 4, and 5 is equispaced from its neighboring number. Thereby, the spaces between the rows of holes on the cover 70 are marked from "$a$" to "$t$" along the right margin and the columns of holes are numbered from "1" to "5" along the bottom of the cover.

The cover 70 is hingedly but firmly attached by an upper hinge 90 and a lower hinge 92 to the board 30. The center lines 61 through 65 for the cylindrical holes in the key 50 correspond exactly with the center lines 81 through 85 for the columns of holes on the cover 70; also, the location of the holes along horizontal lines 61 through 65 are in lines 66 through 69 which correspond to the equispaced center lines 86 through 89 for the rows of holes on the cover 70. The holes, as 76–79, in the cover are all of the same diameter and also of the same diameter as the holes, as 56–59, in the key 50 as well as coaxial therewith.

A horizontal guide strip 94 crosses the cover 70 from left to right and is lettered "F–T–F–A–B–C–D–E." The set of letters "A–B–C–D–E" are used to designate the columns of holes (centered on lines 81–85) and is used for exercises and tests which call for multiple choice or completion responses. The "F–T–F" letters are used to designate columns when the exercise or test calls for true or false responses.

The horizontal guide strip 94 is a dimensionally stable yet flexible continuous piece of cloth and is marked by the letters F–T–F–A.–B.–C.–D.–E. as shown in FIGURES 13 and 14. This guide strip wraps snugly yet movably around the front face of cover 70, its left and right edges and its back. The front face 95 of the guide strip has the letters spaced with their centers the same distance apart as the distance between the centers of the holes in the columns 81, 82, 83, 84, and 85. The ends of the strip 94 on the rear face 96 of guide 94 are held in tension by a piece of elastic 97 joined to those ends to provide a snug fit of the front face of the strip with the cover 70. A tab 98 is attached to guide strip 94 and projects therefrom and provides for convenient manipulation of guide strip 94 around cover 70.

The horizontal guide strip 94 is movable vertically on the cover 70. It is wide enough to cover any of the horizontal rows of holes, such as on lines 86 through 89, as its width is greater than the diameter of said holes. It is however not wide enough to cover more than the spaces between the holes, which spaces are provided with indica as $a, b, c, d, \ldots r, s, t$ on the right side of cover 70. As shown in FIGURE 13 the guide 94 may be located in space "$c$" and the lines of holes, or, as in FIGURES 1, 9, and 14 in space "$a$" which is above the topmost line of holes, and thereby not obstruct any of the rows of holes. In its uppermost position guide 94 provides for a maximum of 20 consecutive rows of 5 holes each.

The vertical guide strip 99 is a continuous flexible loop of band or tape which passes from the rear of the cover 70 through the apertures 73 and 74 to the front of the cover 70. Vertical guide strip 99 extends down the length of the cover 70: it is numbered to designate rows of holes corresponding to the numbers of questions on sheet 27. Strip 99 is movable sideways to cover any one of the desired longitudinal columns of holes, such as centered on lines 81 to 85, and provided with indicia as 1, 2, 3, 4, 5, or may be moved to position "0" as in FIGURES 1, 9, and 13 whereat it covers no holes.

The vertical guide 99 is formed of a dimensionally stable continuous loop of flexible fabric or tape, the front face of which is sequentially numbered 1, 2, 3, 4, 5, 6, 7, 8, 9, 0, 1, 2, 3, 4, 5, 6, 7, 8 9, 0, 1, 2, 3, 4, 5, 6, 7, 8, 9, 0: this tape is provided with a firmly attached projecting tab 103 whereby to adjust the indicia on the guide 99 in relation to the rows of holes on the front of cover 70 by rotating the guide about the cover. With the tab 103 the numbers on the vertical guide 99 are movable to correspond with any of the rows of holes between or below any two of the vertical indicia such as "$a, b, c, d, e, f, g, \ldots r, s, t$" provided on the front face of the cover 70. The front face of guide strip 94 is located between the cover 70 and the rear of the front band of guide strip 99.

The dimensions of the exemplary embodiment of apparatus 20 shown in FIGURES 1 through 14 are given in Table I.

The work sheet 27 is a typical objective type of examination paper as shown, in part, in Tables II or III herebelow. Each such paper 27 is substantially opaque and readily marked by a soft lead pencil and contains a number of common questions as 1–6 on Tables II and III. These questions have corresponding answer record spaces provided on the right hand side of the sheet.

In the case of the true-false questions, as in Table III, the bottom of each line of letters forming the question, in the operative position of the apparatus 20, as shown in FIGURE 1, corresponds to the bottom of a hole, as 56, 57, 58, or 59 in the key 50 and to one of the corresponding row of holes on cover 70 thereabove.

In the case of multiple choice questions as in Table II, each of the lines of possible answers indicated as ($a$) . . . ($b$) . . . ($c$) . . . ($d$) . . . is, in the operative position of the apparatus as shown in FIGURE 1, in line with a horizontal row of holes on cover 70 and a hole in key 50 therebelow.

TABLE I

| From | To | Item | Dimension | Inches |
|---|---|---|---|---|
| Edge | Edge | | | |
| 32 | 35 | | | 12 |
| 33 | 35 | | | ½ |
| 37 | 38 | | | 12 |
| {Line | {Line | | | |
| {66 | {67 | | | ½ |
| {Slot | {Edge | | | |
| {74 | {35 | | | ½ |
| | | 30 | Thickness | ⅛ |
| | | 70 | Width | 2¾ |
| {Surface | {Surface | | | |
| {43 | {31 | | | ⅛ |
| | | 70 | Thickness | ⅛ |
| | | 40 | Width | ⅝ |
| | | 42 | do | 7/16 |
| | | 66 | Diameter | 5/32 |
| | | 56 | do | 5/32 |
| | | 50 | Width | 1¾ |
| | | | Thickness | ⅛ |
| | | 34 | Length | 3¾ |
| | | | Width | ⅛ |
| | | 73, 74 | Length | 1¾ |
| | | | Width | ⅛ |
| {Line | {Line | | | |
| {86 | {87 | | | |
| | | | Space | ½ |
| | | 111 | Diameter | 1 |

In the above described embodiment the spaces "a, b, c, d, . . . r, s, t" between the rows of holes as 86 through 89 allows for two lines of standard elite type for each question assuming one line of type is skipped between questions as in Table II.

With the apparatus of this invention the numbers marked on the vertical guide strip 99 refer to question numbers on the test or exercise; thus, numbers on the vertical guide 99 do not have to be in the same absolute position as the question numbers relative to the bottom of the page (which is in line with slot 74). Number 1 on the vertical guide 99 should always correspond with the row of holes on cover 70 which comes immediately below the horizontal guide 94. For example, if horizontal guide 94 covers the space marked "c," then number 1 on the vertical guide 99 should correspond in height with the row of holes between "c" and "d" and with the proper answer to question No. 1 on the exercise or test, as shown in FIGURE 13. When the bottom row of holes is reached as, in this case with question 18, continue at the top row of holes of cover 70. The number at the top of the vertical guide 99 (as "9" in FIGURE 13) is always the number which follows the bottom number on the guide (as "8" in FIGURE 13) in the unit place, for example, when 7 on guide 99 is at the bottom row of holes, 8 on the guide will be at the top row of holes; when 5 is at the bottom row, 6 will be at the top row, etc.

Figure 5:
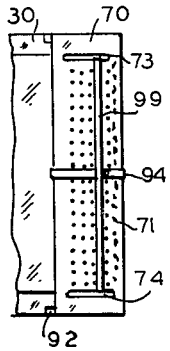

The student or examinee sets the guides 94 and 96 according to the identification marked on the key of the test; for instance, on the sample test given in Table I the key identification is "Green 4 J-1": the horizontal guide 99 is adjusted to cover the space in the right margin by the letter "j," the vertical guide 94 is adjusted to cover the column of holes marked "1" along the bottom of the cover as in FIGURE 5 and the green key (50) is used with indicia 4 facing up and at the top of slot 43 as shown in FIGURE 9 for the position of key 50.

To place the key properly for any given exercise in the device 20 the cover 70 is opened as shown in FIGURE 9. The key, as 50, is then inserted in the exposed slot with the appropriate key designation (as "3" in FIGURE 9) facing up. The right margin of the exercise sheet 27 is then placed on top of the key and meets the left edge of raised portion 48 of guide 42 and the cover is moved back into its closed position as shown in FIGURES 7 and 8. The exercise is also passed under and held by the clamping means 36 as well as by the cover 70. The cover 70 is also provided with a readily releasable latch 91 which holds on to a latch pin 13 (on base 30). The student is then ready to proceed.

For instance, in the sample questions of Table II, the correct answer to question 1 is the answer indicated by "c" on sheet 27. The examinee answers the question by moving his marker, the point of a dulled soft lead pencil, to the hole in cover 70 indicated as row 1 by guide strip 99 and to the hole in the column indicated as "C" by guide 94 and inserts his marker in that hole. The student or examinee is immediately rewarded by the knowledge that he has answered a question correctly because his marker penetrates the paper of sheet 27 with a simultaneous sound of puncturing of that paper. If the examinee's or student's first attempted response does not penetrate the paper (because holes in cover and key do not coincide) the student is encouraged to move the pencil from hole to hole in that same row until his marker penetrates the matching hole, thus finding the correct response and answer. It will be noted that this procedure and apparatus precludes a necessity for lengthy and delayed reviews of tests and exercises for the student or examinee to determine the correct response; if the student misses the first time, he may readily find the correct response before proceeding. This procedure and apparatus thus provides that the student or examinee finds the correct answer without delay and without the help of a teacher.

When this apparatus is used for testing, the student's marker makes a record on the paper of sheet 27 which can be readily noted by the teacher or grader of the examination sheet. This is especially adapted and convenient for right-minus-wrong grading.

This apparatus is designed so that, by swinging the cover 70 to one side as shown in FIGURE 9 any one of a large selection of keys, as 39 in lieu of 50 may be inserted into the slot 40 and the tapes as 94 and 99 positioned as instructed so that the student or examinee may be graded on and/or learn from each such test or exercise as he answers the questions of each such test or exercise. In view of the symmetry of outline of the key, as 50, and the asymmetry of the pattern of holes in the key, as 50 one such key and two tapes provides a very great number of scoring patterns, all with a very simple apparatus. The apparatus is arranged to be keyed to generally recognized standardized test, such as the Metropolitan tests, Iowa tests, California tests, and the Diagnostic Reading Test of the Committee on Diagnostic Reading Tests. It is adapted for use with other work books and is, regardless of basic key, ready to be utilized in locally devised situations of tests and exercises, as below described. A finger hole 111 in the floor 46 of the slot 40 near the upper end of the slot 40 permits the user of the apparatus to pass his finger through such hole to expedite removal of the key from the slot; the key fits firmly yet removably in the slot.

Generally, to utilize a Teacher's Helper in locally devised situations the teacher simply chooses a key, such as 50, at random and then arranges a multiple choice, completion, or true-false response to conform to that chosen key. Thus, in the format of questions as in Table II the correct answer to a question 7, because of the particular key used, might be "D": the teacher's question might be "7." "Air is a ———."; responses would then be arranged on the test sheet 27 so that the proper response to be chosen would be "D" as for example "(A) wind (B) liquids (C) solid (D) gas."

TABLE II

*Sample questions (multiple choice)*

Grn 4 (j-1)

(1) If Tom and Mary have 4 apples each and Tom gives one of his to Jim, Tom has———apples left. (a) 7 (b) 1 (c) 3 (d) none of these.

(2) If a=1, then b= (a) any of these (b) 2 (c) any number but 1 (d) any number.

(3) If angle A is 90 degrees and angle B is 60 degrees, angle C is (a) 180 (b) 60 (c) 30 (d) 90 degrees.
(4) The female organ of a flowering plant is the (a) stamin (b) pistil (c) carolla (d) receptacle.
(5) The type of reproduction that requires the union of sperm and ovum is known as (a) asexual (b) budding (c) binary fusion (d) sexual.
(6) The crust of the earth is thickest (a) under mountains (b) under continents (c) under flat ground (d) under oceans.

TABLE III
*Sample questions (true-false)*

T–F green 1 (g, 0)

(1) To square a number, multiply it by itself two times.
(2) Whole numbers have a denominator of 0.
(3) To change a percent to a decimal, move the decimal two places to the left and remove the %.
(4) John did his homework in 55 minutes. Mary finished hers in 30 minutes. Mary finished a half hour before John.
(5) Generally high land is cooler than low land.
(6) The Great Wall of China is 1000 miles long.

Figure 6:
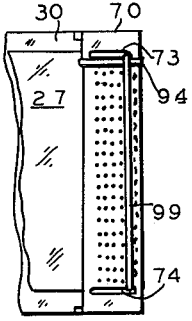

With the apparatus of the invention the teacher may choose any of several standardized keys, such as 50 or 39, each having different identifying colors or other indicia distinguishing keys of different asymmetric patterns of holes (but otherwise similar in outline, thickness and location of lines and columns of holes with respect to the holes in cover 70 as in key 50) being certain to use the key with the correct number of response choices for the intended test or exercise, i.e. 5 choices, 4 choices, 3 choices, or 2 choices apiece. It is to be noted that the five longitudinal rows provided in the key 50 and the cover 70 provide for five choices; however, by moving the longitudinal guide 99 to cover one column, i.e. as column 5 as shown in FIGURE 6, or column 1 as shown in FIGURE 4. Only four choices are available while when the guide is moved to cover one such column. However, when as in FIGURES 1, 9, and 14, it is column "0" that locates guide 99 five choices are then available.

A feature of this invention is that by leaving the lettered identify of the response to be filled in at a later time the teacher may use the same form of the same questions and simply change the key and redesignate the response identity. Thereby, the person undergoing the particular test or exercise, on again making the mistake, will again be able to relocate the proper answer and thereby affect their teaching or learning without taking the time of the teacher unless problems arise.

The following examples are given of the operation of the apparatus.

EXAMPLE 1.—GENERAL INSTRUCTIONS TO EXAMINEE (1) A key as 50 is chosen according to the instructions as on top right corner of the exercise of Table II.
(2) Swing the cover 70 to the left to expose the key slot as in FIGURE 9 and insert the key in the slot according to the instructions.
(3) Set movable guides 94 and 99 according to the markings provided on the question sheet.
(4) To position the question sheet, slip the sheet 27 under the elastic strip 36 to the left of the base 30. Adjust the question sheet 27 so that the wide right hand marking thereof covers the key 50. This is done by moving the sheet of the right so that the right hand margin contacts the shoulder guide 48. Close the cover 70.
(5) Examinee then proceeds as above described in column 5, lines 55, 75 and column 6, lines 1–26, hereinabove.

EXAMPLE 2.—TEACHER-DEVISED MATERIAL

The teacher arbitrarily picks a letter from "*a*" to "*t*" for setting the vertical level of the horizontal guide 94. The horizontal guide is for instance adjusted to cover the space marked "C" as in FIGURE 4. The teacher similarly selects and adjusts the vertical guide 99 to cover the holes in the column marked "1," thus exposing the four vertical columns, i.e. 2, 3, 4, and 5. The cover 70 is then replaced as in FIGURES 7 and 8.

Inasmuch as the base portion 47 of the floor may, in the teacher's embodiment of the apparatus, be translucent or of a light color and the keys are dark colored as well as opaque, by peering through each row of holes, the teacher determines for such row which hole in the cover coincides with a hole in the particular key. This hole shows the correct response for that key. The designation of the hole of correct response is recorded and an exercise with that key (e.g. green 3, a–0 as in FIGURES 1, 9, and 14) is prepared making sure that the correct response choice agrees with the one recorded. For instance, if it is determined, after peering for coinciding holes in each row, that the hole in column C for the question indicated by "1" on tape 99 shows correct response—i.e. both holes coincide with question number 1—the correct answer to question number 1 is the third choice, etc.

After the guide settings have been given and checked by the teacher the exercise is then placed and held, and used as above described in Example 1.

EXAMPLE 3.—VARIATIONS

For variations on more than 20 questions for 4 choices the following keying procedure is followed:

(1) Set the horizontal guide 94 to cover any vertical index such as "*a, b, c, d, . . . r, s,* or *t.*"
(2) Place the vertical guide 99 so that column 1 is covered and number 1 on the vertical guide corresponds to the first row under the guide 94 so that A on guide 94 is above the second column, and B is above the third column, etc. as in FIGURE 4.
(3) Key as in Example 2 above.
(4) Begin counting for the line of holes on the cover 70 at which any given question on the sheet 27 is to be answered by counting on the vertical guide 99. When the bottom of the vertical row is reached, continue at the top of the vertical guide. The number at the top of the guide 99 is always the number which follows the bottom number on that guide corresponding to a row of holes on cover 70.
(5) When 20 questions have been keyed, raise the cover 70 and remove the key, then reinsert the same key in a different position in slot 43; in the case where, as shown in FIGURE 9, "green 3" had previously been the first key used then "green 2" (see FIGURE 12) becomes the key position following.
(6) After the sixtieth question the key is inverted and "green 1" (bottom of FIGURE 12) becomes the key.
(7) For 81 and subsequent questions through 160 readjust the vertical guide 99 so that column 5 is covered, and adjust the horizontal guide 94 so that A on guide 94 now heads column 1; B now heads column 2, etc. as in FIGURE 5.

After readjustment of the vertical guide has been made as above described, the next 80 questions are made available with different patterns by manipulating the key 50 in reverse order, i.e. green 1 is inverted to green 2; green 2 reverses to green 3; green 3 reverses to green 4.

(8) Answering the series is done by choosing the appropriate key and guide setting as above described for Example 1.

EXAMPLE 5.—VARIATIONS ON A FIVE-CHOICE KEY

Variations on a 5-choice key ore obtained by the following procedure:

(1) The vertical guide 99 is located over column 0, the horizontal guide 94 is set at any desired setting. The horizontal guide 94 is adjusted so that "A" on guide 94 heads column 1, "B" heads column 2, "C" heads column 3, "D" heads column 4, and "E" heads column 5.
(2) After 20 questions have gone through one pattern with this arrangement, the key is then reversed end for end, and thereby 80 questions are taken care of by different patterns of correct response holes on only one key.

(3) Other patterns are available through the reversal or inversion of the same key 50 with readjustment of horizontal guide 94 as above described. Thereby a different answering pattern is obtained for five choices while still using the same key.

EXAMPLE 6.—VARIATION ON THE TRUE-FALSE KEY (1) The vertical guide 99 is set on column 0 (FIG. 1).

Figure 2:
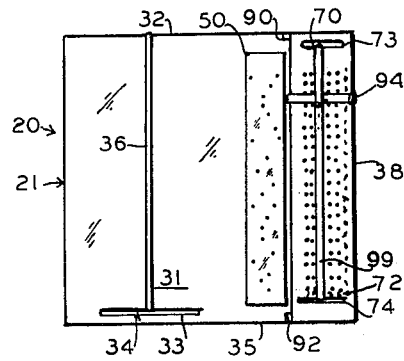
FIGURE 2 is a top plan of the apparatus of FIGURE 1 with the work sheet removed, the key 50 placed alongside the cover, 70, and the guides on the cover moved from their position shown in FIGURE 1.

(2) The horizontal guide 94 is set with T and F heading column 1 and 2 respectively as at FIGURE 2. For this purpose it is desirable that the vertical guide 99 pass on top of the horizontal guide 94 to mask out the second F.

(3) Proceed as in Example 1.

Figure 3:
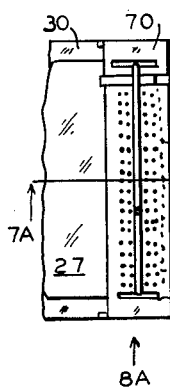

(4) Set the vertical guide over column 3 and move the horizontal guide so that T is above column 4 and F is above column 5 as in FIGURE 3.

(5) Proceed as in Example 1.

Four configurations are thus possible with one face of the single key and sixteen configurations are possible with all four possible inversions of the same key without changing the level of the horizontal guide 94. Changing the level of the horizontal guide provides some twenty variations of these sequences for the T–F test (compare FIGURES 2 and 3).

Although, in accordance with the provision of the patent statutes, a particular preferred embodiment of this invention has been described in detail and the principles of the invention have been described in the best mode in which it is now contemplated applying such principles, it will be understood that the constructions shown and described are merely illustrative and that the invention is not limited thereto and, accordingly, alterations and modifications which readily suggest themselves to persons skilled in the art without departing from the true spirit of the disclosure hereinabove are intended to be included in the scope of the annexed claims.

I claim:

1. Apparatus for indicating, recording, and observing answers which comprises a base board, a key, and a key cover;
    said base board being flat on one side thereof, and having a slot at the other side thereof, said key fitting in said slot;
    said cover being permanently and hingedly attached to said board, said cover means being opaque and provided with a flat upper surface having therein a plurality of rows of holes, said holes being arranged in vertical columns and horizontal rows, each said column being equally spaced from its neighboring column and extending along the length of said cover for a major portion thereof, and each horizontal row being equally spaced from its neighboring row and extending across the width of said cover for the major portion thereof, said holes each passing through said cover means;
    said key formed of substantially non-puncturable opaque material and located on said board between said board and said cover, said key means being provided with a series of holes, said holes being located in columns which are located below the columns of holes in said cover means and in rows which are below the holes in said cover means, the top surface of said key having an outline which is symmetrical about its longitudinal axis and equatorial axis, the holes in said key means being located in a pattern which is asymmetric about said longitudinal axis and about said equatorial axis; and guide means firmly attached on said base board and engaging said key means, and locating said key means in fixed relation on said base board and in fixed relations to said cover, wherein the key has a dark colored upper upwardly facing surface and the top surface of the floor of the slot has a light colored upwardly facing surface, whereby to readily determine for any row which hole in the cover coincides with a hole in the key.

2. Apparatus for indicating, recording, and observing answers which comprises a base board, a key, and a key cover;
    said base board being flat on one side thereof, and having a slot at the other side thereof, said key fitting in said slot;
    said cover being permanently and hingedly attached to said board, said cover means being opaque and provided with a flat upper surface having therein a plurality of rows of holes, said holes being arranged in vertical columns and horizontal rows, each said column being equally spaced from its neighboring column and extending along the length of said cover for a major portion thereof, and each horizontal row being equally spaced from its neighboring row and extending across the width of said cover for the major portion thereof, said holes each passing through said cover means;
    said key formed of substantially non-puncturable opaque material and located on said board between said board and said cover, said key means being provided with a series of holes, said holes being located in columns which are located below the columns of holes in said cover means and in rows which are below the holes in said cover means, the top surface of said key having an outline which is symmetrical about its longitudinal axis and equatorial axis, the holes in said key means being located in a pattern which is asymmetric about said longitudinal axis and about said equatorial axis; and guide means firmly attached on said base board and engaging said key means, and locating said key means in fixed relation on said base board and in fixed relations to said cover, wherein the floor of the slot is translucent, whereby to readily determine for any row which hole in the cover coincides with a hole in the key.

3. Apparatus for indicating, recording, and observing answers which comprises a base board, a key, and a key cover;
    said base board being flat on one side thereof, and having a slot at the other side thereof, said key fitting in said slot;
    said cover being permanently and hingedly attached to said board, said cover means being opaque and provided with a flat upper surface having therein a plurality of rows of holes, said holes being arranged in vertical columns and horizontal rows, each said column being equally spaced from its neighboring column and extending along the length of said cover for a major portion thereof, and each horizontal row being equally spaced from its neighboring row and extending across the width of said cover for the major portion thereof, said holes each passing through said cover means;
    said key formed of substantially non-puncturable opaque material and located on said board between said board and said cover, said key means being provided with a series of holes, said holes being located in columns which are located below the columns of holes in said cover means and in rows which are below the holes in said cover means, the top surface of said key having an outline which is symmetrical about its longitudinal axis and equatorial axis, the holes in said key means being located in a pattern which is asymmetric about said longitudinal axis and about said equatorial axis; and guide means firmly attached on said base board and engaging said key means, and locating said key means in fixed relation on said base board and in fixed relation to said cover;
    wherein said key cover comprises also
        (a) a horizontally elongated continuous flexible guide strip of material extending across and wrapping around the said cover and having a width at least as great as the diameter of the holes in said board and less than the distance between said rows of holes, means attached to the ends of said strip firmly yet slidably holding said strip on said board, said horizontally elongated strip of flexible means being provided with indicia spaced apart the same distance as the columns of holes in said cover, and (b) an elongated vertical flexible continuous guide strip having a width at least as great as the diameter of any of the holes in said cover wrapped about said cover and extending on the front and rear surfaces of said cover longitudinally from substantially near the top to substantially near the bottom of said cover, means attached to the ends of said vertical strip and holding it firmly yet movably to said cover, said vertical strip of material being horizontally movable across said cover, said vertical guide strip being provided with indicia each spaced apart the same distance as the rows of holes in said cover, said vertical guide being movable whereby to place any of said indicia on said strip of material at the level of any of the rows of holes on said cover, and (c) a horizontally elongated aperture passing through said cover below the level of the holes therein and extending across a portion of the width of the cover at least as great as the width thereof covered by any of said rows of holes, said vertical guide means being located with at least one end thereof passing through said horizontally elongated aperture.

4. Apparatus for indicating, recording, and observing answers which comprises a base board, a key, and a key cover;

said base board being flat on one side thereof, and having a slot at the other side thereof, said key fitting in said slot;

said cover being permanently and hingedly attached to said board, said cover means being opaque and provided with a flat upper surface having therein a plurality of rows of holes, said holes being arranged in vertical columns and horizontal rows, each said column being equally spaced from its neighboring column and extending along the length of said cover for a major portion thereof, and each horizontal row being equally spaced from its neighboring row and extending across the width of said cover for the major portion thereof, said holes each passing through said cover means;

said key formed of substantially non-puncturable opaque material and located on said board between said board and said cover, said key means being provided with a series of holes, said holes being located in columns which are located below the columns of holes in said cover means and in rows which are below the holes in said cover means, the top surface of said key having an outline which is symmetrical about its longitudinal axis and equatorial axis, the holes in said key means being located in a pattern which is asymmetric about said longitudinal axis and about said equatorial axis; and guide means firmly attached on said base board and engaging said key means, and locating said key means in fixed relation on said base board and in fixed relations to said cover;

wherein said key cover comprises also (a) a horizontally elongated continuous flexible guide strip of material extending across and wrapping around the said cover and having a width at least as great as the diameter of the holes in said board and less than the distance between said rows of holes, means attached to the ends of said strip firmly yet slidably holding said strip on said board, said horizontally elongated strip of flexible means being provided with indicia spaced apart the same distance as the columns of holes in said cover, and (b) an elongated vertical flexible continuous guide strip having a width at least as great as the diameter of any of the holes in said cover wrapped about said cover and extending on the front and rear surfaces of said cover longitudinally from substantially near the top to substantially near the bottom of said cover, means attached to the ends of said vertical strip and holding it firmly yet movably to said cover, said vertical strip of material being horizontally movable across said cover, said vertical guide strip being provided with indicia each spaced apart the same distance as the rows of holes in said cover, said vertical guide being movable whereby to place any of said indicia on said strip of material at the level of any of the rows of holes on said cover, and (c) a horizontally elongated aperture passing through said cover below the level of the holes therein and extending across a portion of the width of the cover at least as great as the width thereof covered by any of said rows of holes, said vertical guide means being located with at least one end thereof passing through said horizontally elongated aperture, and (d) wherein sequential indicia are provided between the respective sequential rows of holes on said cover and sequential indicia are sequentially provided in line with each of the columns of holes in said cover.

References Cited by the Examiner
UNITED STATES PATENTS

| | | | |
|---|---|---|---|
| 993,680 | 5/11 | Herbert | 35—75 |
| 1,644,160 | 10/27 | Thompson | 35—48.1 |
| 1,797,744 | 3/31 | Wiley | 35—48 |
| 1,842,470 | 1/32 | Brownlee | 35—48.1 |
| 2,385,347 | 9/45 | Chadwell | 35—24.4 |
| 2,540,363 | 2/51 | Wister | 35—48.1 |
| 2,859,541 | 11/58 | Parmenter | 35—48.1 |
| 2,983,052 | 5/61 | Gainey | 35—9 |

JEROME SCHNALL, *Primary Examiner.*

LAWRENCE CHARLES, *Examiner.*